(12) United States Patent
Wei

(10) Patent No.: US 8,995,379 B2
(45) Date of Patent: Mar. 31, 2015

(54) METHOD AND DEVICE FOR ACTIVATING AND DE-ACTIVATING UPLINK OF SECONDARY CELL OF TERMINAL

(75) Inventor: Yuxin Wei, Beijing (CN)

(73) Assignee: Sony Corporation, Tokyo (JP)

(*) Notice: Subject to any disclaimer, the term of this patent is extended or adjusted under 35 U.S.C. 154(b) by 115 days.

(21) Appl. No.: 13/814,578

(22) PCT Filed: Jul. 13, 2011

(86) PCT No.: PCT/CN2011/077101
§ 371 (c)(1),
(2), (4) Date: Feb. 6, 2013

(87) PCT Pub. No.: WO2012/019502
PCT Pub. Date: Feb. 16, 2012

(65) Prior Publication Data
US 2013/0136094 A1 May 30, 2013

(30) Foreign Application Priority Data
Aug. 13, 2010 (CN) .......................... 2010 1 0254678

(51) Int. Cl.
H04W 4/00 (2009.01)
H04W 52/02 (2009.01)
H04L 5/00 (2006.01)

(52) U.S. Cl.
CPC ........... *H04W 52/0203* (2013.01); *H04L 5/001* (2013.01); *H04L 5/0098* (2013.01); *H04L 5/0037* (2013.01); *H04L 5/0064* (2013.01); *H04L 5/0087* (2013.01)
USPC .......................................... 370/329; 370/437

(58) Field of Classification Search
CPC . H04W 72/04; H04W 72/002; H04W 74/002; H04W 72/1278
USPC .................. 370/328–330, 338, 343, 389, 392, 370/400–401, 436–437, 465, 468, 480, 482
See application file for complete search history.

(56) References Cited

U.S. PATENT DOCUMENTS 8,489,105 B2 * 7/2013 Choi .......................... 455/452.1
8,619,649 B2 * 12/2013 Jen ............................. 370/310.2

(Continued)

FOREIGN PATENT DOCUMENTS

CN 101268635 9/2008

OTHER PUBLICATIONS

International Search Report Issued Oct. 20, 2011 in PCT/CN11/77101 Filed Jul. 13, 2011.

*Primary Examiner* — Kevin Mew
(74) *Attorney, Agent, or Firm* — Oblon, McClelland, Maier & Neustadt, L.L.P.

(57) ABSTRACT

A method and device for activating and de-activating an uplink of a secondary cell of a terminal. The method includes: determining a number of component carrier waves an RF chain of the terminal can simultaneously receive; determining an activation method to be used for uplink activation according to the number of component carrier waves; and, based on needs, sending information that carries the activation method. Using the method and device, one can determine the activation or de-activation method according to the number of the component carrier waves the terminal's RF chain can simultaneously receive, thus conserving electricity consumption of the terminal and avoiding communication interruptions.

25 Claims, 9 Drawing Sheets

(56) References Cited

U.S. PATENT DOCUMENTS

| | | | |
|---|---|---|---|
| 8,737,336 B2 * | 5/2014 | Lohr et al. | 370/329 |
| 8,737,945 B2 * | 5/2014 | Jung et al. | 455/226.2 |
| 8,767,663 B2 * | 7/2014 | Chang et al. | 370/329 |
| 2007/0036121 A1 | 2/2007 | Cherian et al. | |
| 2009/0257387 A1 | 10/2009 | Gholmieh et al. | |
| 2010/0130219 A1 | 5/2010 | Cave et al. | |
| 2010/0215011 A1 * | 8/2010 | Pan et al. | 370/329 |
| 2011/0014922 A1 * | 1/2011 | Jen | 455/450 |
| 2011/0274198 A1 * | 11/2011 | Cheng | 375/267 |
| 2011/0292894 A1 * | 12/2011 | Wu | 370/329 |
| 2011/0310937 A1 * | 12/2011 | Lin et al. | 375/219 |
| 2011/0319129 A1 * | 12/2011 | Bhat et al. | 455/552.1 |
| 2012/0057547 A1 * | 3/2012 | Lohr et al. | 370/329 |
| 2012/0113831 A1 * | 5/2012 | Pelletier et al. | 370/252 |
| 2012/0213089 A1 * | 8/2012 | Shi et al. | 370/241 |
| 2012/0300667 A1 * | 11/2012 | Dalsgaard et al. | 370/252 |
| 2013/0010714 A1 * | 1/2013 | Kim et al. | 370/329 |

* cited by examiner

METHOD AND DEVICE FOR ACTIVATING AND DE-ACTIVATING UPLINK OF SECONDARY CELL OF TERMINAL

CROSS REFERENCE TO RELATED APPLICATIONS

This application is based on the PCT Application No. PCT/CN2011/077101 filed on Jul. 13, 2011 and entitled "Method And Device for Activating And De-Activating Uplink Of Secondary Cell Of Terminal", claiming priority to Chinese Application No. 201010254678.4 filed on Aug. 13, 2010 and entitled "Method And Device for Activating And De-Activating Uplink Of Secondary Cell Of User Equipment". The contents of both of the applications are incorporated herein by reference.

FIELD

The application relates to communication field and particularly to a method and apparatus for activating and deactivating the uplink of a secondary cell of user equipment.

BACKGROUND

The future LTE-A (Long Term Evolution Advanced) system will support a transmission bandwidth up to 100 MHz, while the maximum transmission bandwidth supportable by the LTE (Long Term Evolution) standard is 20 MHz. Thus to achieve the higher transmission bandwidth, it requires to aggregate multiple carriers. Carrier aggregation (CA) is a technique of aggregating multiple carriers for combined transmission, which is proposed by 3GPP (3rd Generation Partnership Project) to meet the high transmission bandwidth requirement of the future mobile systems. Carrier aggregation may be classified into consecutive carrier aggregation and non-consecutive aggregation based on the positions of the carriers that are aggregated on the spectrum. LTE-A will support both of the two CA scenarios. While introducing the CA technique, 3GPP also considers its backward compatibility, which means that user equipments (UEs) supporting CA and UEs not supporting CA will co-exist for a long time in the future. A CA supporting UE can be connected to a plurality of component carriers (CCs) at the same time, and a UE not supporting CA can be connected to only a certain CC.

FIGS. 1, 2, and 3 illustrate application scenarios of the present application. The 3 application scenarios as shown are preferred deployment scenarios for carrier aggregation and represent 3 typical application examples of carrier aggregation. In FIG. 1 the coverage of the cells corresponding to carriers F1 and F2 are substantially coincident, i.e. F1 and F2 provide coverage areas similar to each other. F1 and F2 may be arranged in the same carrier band, which is a typical consecutive CA scenario. FIGS. 2 and 3 each show an example of non-consecutive CA, in which F1 and F2 may be located in different carrier band. The cell corresponding to F1 is used to ensure the coverage and the cell corresponding to F2 is used to improve the throughput. The difference between FIG. 2 and FIG. 3 lies in that, in FIG. 3 the antenna of the cell corresponding to F2 is directed to the edge area of the cell corresponding to F1, therefore the application scenario of FIG. 3 can significantly improve the throughput of the edge area of the cell corresponding to F1.

To simplify the wireless resource management under CA scenarios, LTE-A introduces the concept of "primary frequency". Accordingly, the cell corresponding to the primary frequency is referred to as a "primary cell". When UE has a high data transmission requirement, it may enter into CA transmission mode, and thus the UE needs to be allocated with a new component carrier (CC), that is, a secondary cell needs to be provided to the UE. In the CA operation mode, in order to maintain the power consumption of the UE at a normal level, a mechanism of activating and deactivating the downlink of the secondary cell is introduced. When the secondary cell is deactivated, the UE does not receive the corresponding control channel information (PDCCH or PDSCH), and needs not to measure the channel quality. When the secondary cell is activated, the operation is the reverse, that is, the UE receives the corresponding control channel information. The activating or deactivating of the downlink of the corresponding secondary cell is decided by a control signaling (control element) in the media access control (MAC) layer transmitted by the base station, or the downlink of a secondary cell may be deactivated in an implicit manner by using a timer.

To activate the uplink of a secondary cell, the most natural processing manners including two types. One activating manner is similar to the activating of the downlink, i.e. an activating command may be explicitly transmitted to activate the uplink of the secondary cell. This explicit command can be transmitted together with the command for activating the downlink of the secondary cell. Alternatively, the uplink of the secondary cell can be activated separately when the uplink data transmission amount increases. Another uplink activating manner is an implicit manner. In other words, when the downlink of a secondary cell is activated, the uplink corresponding to this downlink is activated at the same time. In this manner, explicitly transmitting a command of activating the uplink is not needed.

The advantage of using the explicit command lies in that, for UE having only a single RF chain, the transmission bandwidth may be adjusted as the sum of bandwidths of activated cells, instead of being set as the sum of bandwidths of all the cells allocated to the UE (the number of all the cells allocated to the UE is larger than or equal to the number of the activated cells). In this way, the power consumption of the UE can be further saved. The disadvantage of using the explicit command lies in that, when the uplink of a new secondary cell is needed to be activated, the delay necessary for adjusting the RF transmission bandwidth can result in communication interrupt or data loss during the time period of the delay. In addition, the use of the explicit MAC layer control signaling may increase the amount of corresponding control information.

The advantage of using the implicit command lies in that, the amount of MAC layer control information is not increased and the process of transmitting and handling the control signaling is implied. The disadvantage of using the implicit command lies in that, for UE having only a single RF chain, the transmission bandwidth is the sum of bandwidths of all its cells, regardless of whether the secondary cell(s) is activated or not. In this way, the power consumption of the UE is increased. At the same time, the advantage thereof is that, when the uplink of a new secondary cell is activated, the transmission bandwidth needs not to be adjusted and thus no communication interrupt and data packet loss are resulted.

It is to be noted that, in the disclosure the so-called uplink and downlink may be correlated with each other based on system information block 2 (SIB2) (i.e. cell-based correlation), or may be correlated based on UE.

As can be seen from above, for UE having only a single RF chain, power consumption and communication interrupt are two key issues, which can not be solved at the same time by the above explicit command manner or by the implicit command manner.

SUMMARY

The following presents a simplified summary of the invention in order to provide a basic understanding of some aspects of the invention. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

The invention is directed to solve the above problem in the related art. The manner of activating or deactivating the uplink of a secondary cell of UE is determined by the number of CCs that can be received at the same time via the RF chain of the UE, to save the power consumption of the UE and avoid communication interrupt thereof.

According to one aspect of the invention, there is provided a method for activating an uplink of a secondary cell for user equipment including: determining the number of component carriers received simultaneously by a radio frequency chain for the user equipment; determining an activating manner employed for activating the uplink according to the number of the component carriers; and sending a message carrying the activating manner as desired.

According to another aspect of the invention, there is provided a method for deactivating an uplink of a secondary cell for user equipment including: determining the number of component carriers received simultaneously by a radio frequency chain for the user equipment; determining a deactivating manner employed for deactivating the uplink according to the number of the component carriers; and sending a message carrying the deactivating manner as desired.

According to yet another aspect of the invention, there is provided an apparatus for activating an uplink of a secondary cell for user equipment including: a component carrier number determining first module, for determining the number of component carriers received simultaneously by a radio frequency chain for the user equipment; an activating manner determining module, for determining an activating manner employed for activating the uplink according to the number of the component carriers; and a message transmitting first module, for sending a message carrying the activating manner as desired.

According to yet another aspect of the invention, there is provided an apparatus for deactivating an uplink of a secondary cell for user equipment including: a component carrier number determining second module, for determining the number of component carriers received simultaneously by a radio frequency chain for the user equipment; an activating manner determining module, for determining an deactivating manner employed for deactivating the uplink according to the number of the component carriers; and a message transmitting second module, for sending a message carrying the deactivating manner as desired.

According to yet another aspect of the invention, there is provided a method for activating an uplink of secondary cell for user equipment including: receiving a message carrying an activating manner; and activating the uplink according to the activating manner.

According to yet another aspect of the invention, there is provided a method for deactivating an uplink of secondary cell for user equipment including: receiving a message carrying a deactivating manner; and deactivating the uplink according to the deactivating manner.

According to yet another aspect of the invention, there is provided an apparatus for activating an uplink of secondary cell for user equipment, including: a first receiving module, for receiving a message carrying an activating manner; and an activating module, for activating the uplink according to the activating manner.

According to yet another aspect of the invention, there is provided an apparatus for deactivating an uplink of secondary cell for user equipment, including: a second receiving module, for receiving a message carrying an deactivating manner; and a deactivating module, for deactivating the uplink according to the deactivating manner.

In addition, an embodiment of the invention provides computer program for realizing the above methods.

Furthermore, an embodiment of the invention provides a computer program product in the form of computer readable medium on which there are recorded computer program codes for the above methods.

The above and other advantages of the disclosure can be more apparent with reference to the best mode of the invention in conjunction with the accompanying drawings.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

Figure 1:
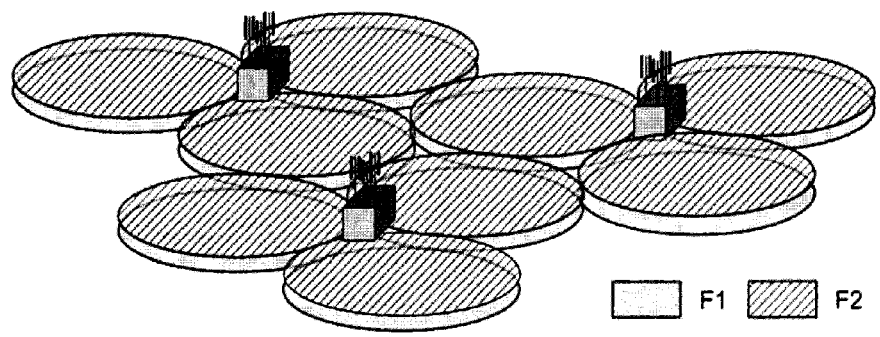
FIG. 1 is a schematic diagram showing a first CA scenario according to the related art.
Figure 2:
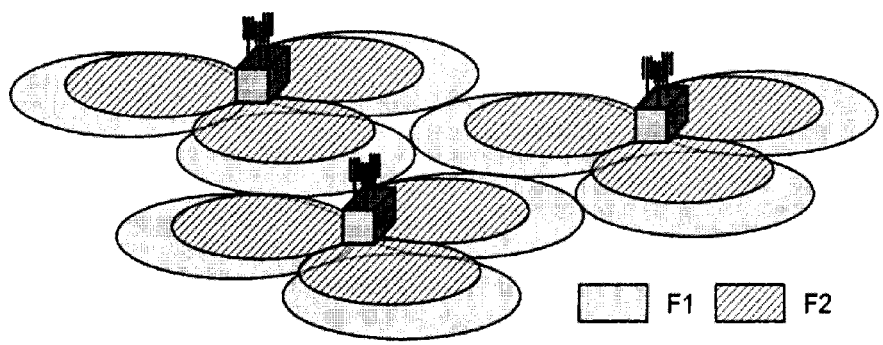
FIG. 2 is a schematic diagram showing a second CA scenario according to the related art.
Figure 3:
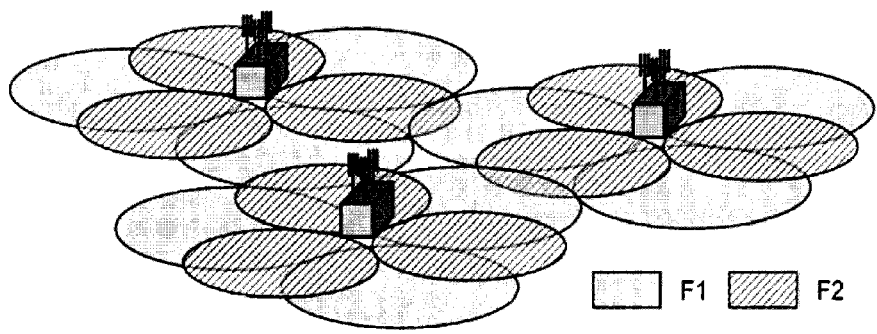
FIG. 3 is a schematic diagram showing a third CA scenario according to the related art.
Figure 4:
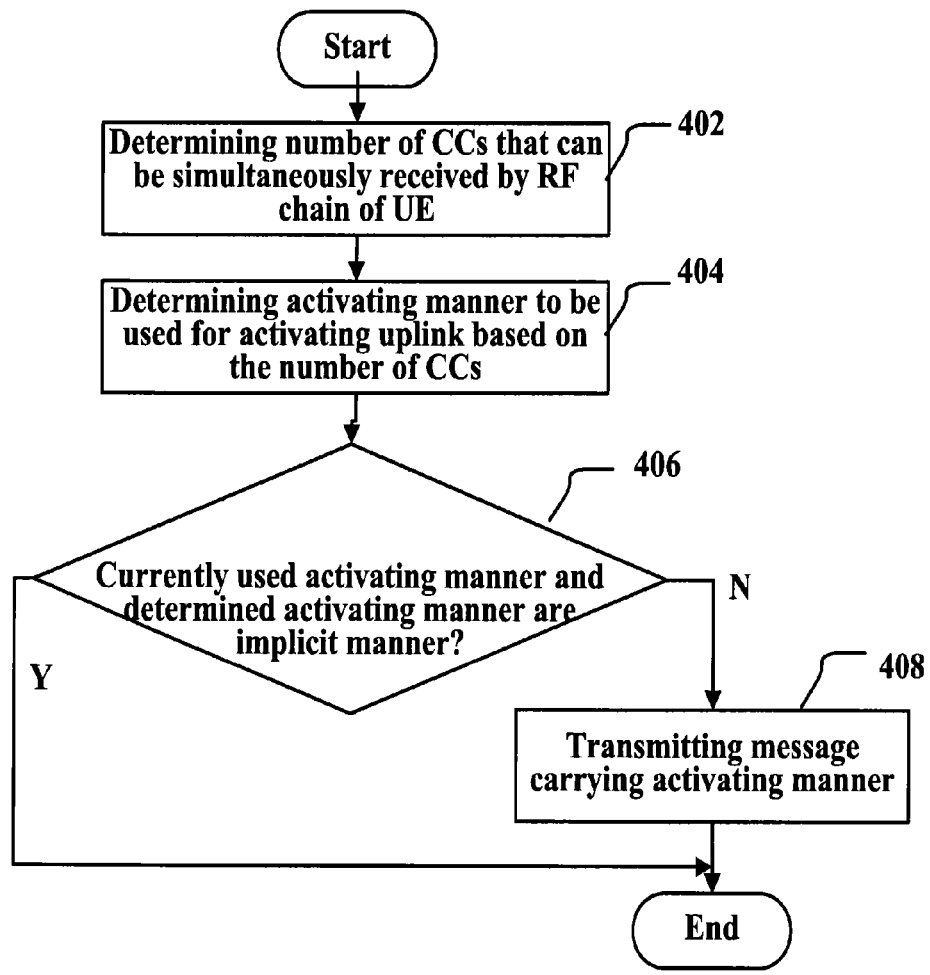
FIG. 4 is a schematic flow chart showing a method of activating by a base station an uplink of a secondary cell of a UE according to an embodiment of the invention.

Referring to FIG. 4, a method of activating by a base station an uplink of a secondary cell of a UE according to an embodiment of the invention is described below.

As shown in FIG. 4, in step 402 the number of CCs that can be simultaneously received via the RF chain of the UE is determined. In step 404, the activating manner for activating the uplink is determined based on the number of the CCs. In step 406, it is determined whether the currently used activating manner and the activating manner determined in step 404 both are implicit activating manner. If either of the currently used activating manner and the activating manner determined in step 404 is explicit activating manner (No in step 406), a message indicating the determined activating manner is sent in step 408. If the currently used activating manner and the activating manner determined in step 404 both are implicit activating manner (Yes in step 406), it is preferred not to send the message indicating the determined activating manner.

In the embodiment, if the currently used activating manner is an implicit activating manner and the activating manner determined to be used is an explicit activating manner, or if the currently used activating manner is an explicit activating manner and the activating manner determined to be used is an explicit activating manner, or if the currently used activating manner is an explicit activating manner and the activating manner determined to be used is an implicit activating manner, a message indicating the determined activating manner is sent. If the currently used activating manner and the activating manner determined to be used both are implicit activating manner, it is preferred not to send the message indicating the determined activating manner. That is, the message indicating the determined activating manner is sent as desired.

The message may be an MAC layer control signaling transmitted by the base station. Of course, the message can be transmitted by the UE alternatively.

Figure 5:
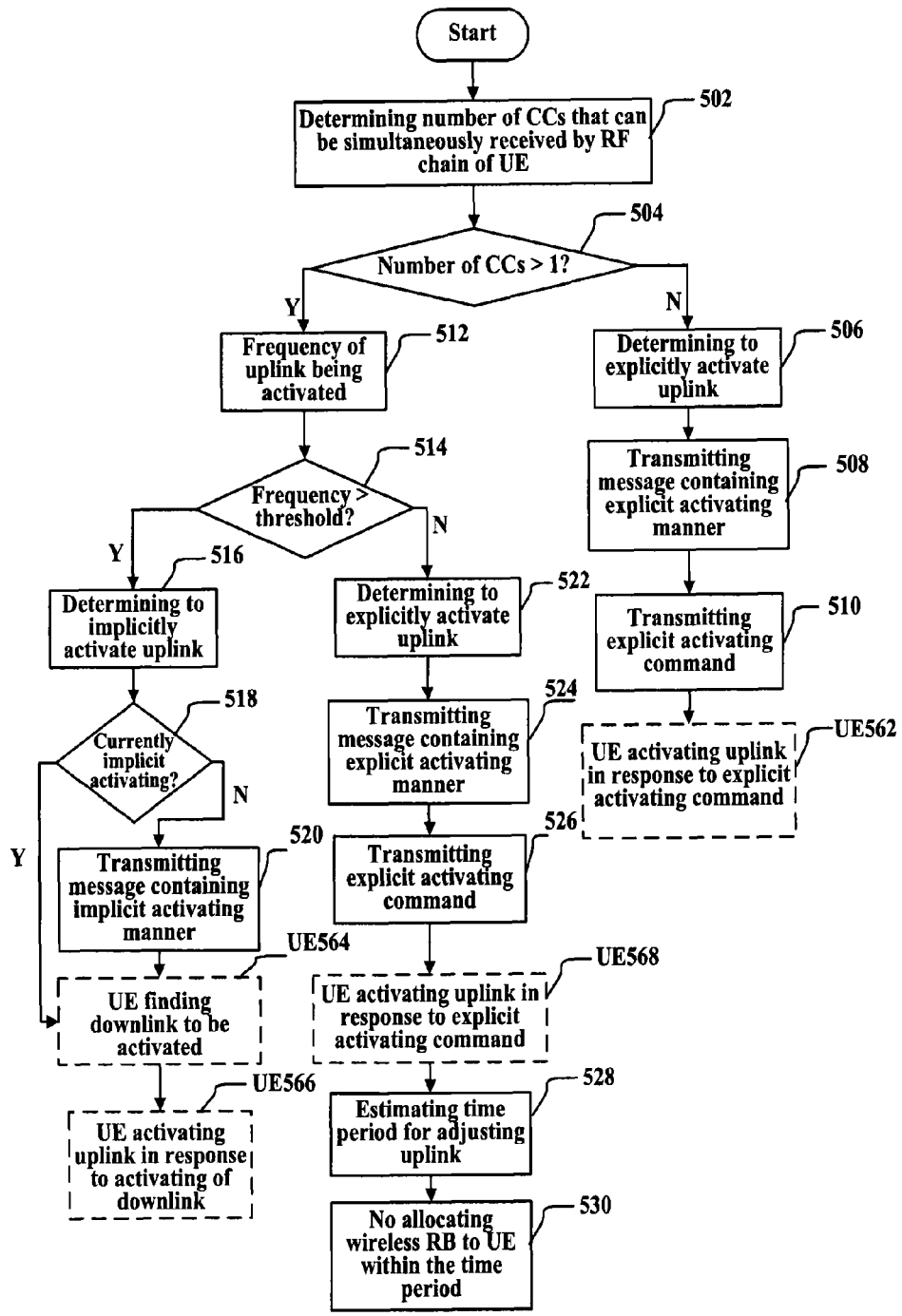
FIG. 5 is a schematic flow chart showing a method of activating by a base station an uplink of a secondary cell of a UE according to another embodiment of the invention.

Referring to FIG. 5, a method of activating by a base station an uplink of a secondary cell of a UE according to another embodiment of the invention is described below.

As shown in FIG. 5, in step 502 the number of the CCs that can be simultaneously received via the RF chain of the UE is determined. In step 504, it is determined whether the number of CCs is larger than 1. If the data of only one CC can be received on a radio frequency chain (No in step 504), in step 506 the uplink of the secondary cell corresponding to the frequency is activated by using the explicit activating manner after the downlink of the secondary cell is activated. In other words, whether the uplink of the secondary cell is activated is decided based on the requirements of data transmission. In an example in which only the data of one CC is received on a certain radio frequency chain, for the inter-frequency CA mode, two CCs are used where the central frequency of one of the CCs is at 800 MHz and the central frequency of the other of the CCs is at 2 GHz; the UE has two RF chains where one RF chain corresponds to the frequency of 800 MHz and the other RF chain corresponds to the frequency of 2 G. In another example in which only the data of one CC is received on a certain radio frequency chain, for the intra-frequency CA mode, two CCs are used where the central frequencies of both CCs are at 800 MHz; the UE has two RF chains and each of the two CCs can be allocated respectively to the corresponding one of the two RF chains.

In step 508, a message indicating that the explicit activating manner is determined in the above step is transmitted. In the case of data transmission requirement, an explicit activating command is transmitted in step 510, and the UE activates the uplink in response to the explicit activating command (step UE562).

Regarding the CA transmission mode, the UE is not required to employ the symmetrical transmission. That is, using the downlink of a carrier (cell) for transmission does not necessarily mean that the corresponding uplink carrier (cell) is required for transmission. In the transition process of the secondary cell from the deactivated state to the activated state, since only one carrier frequency is allocated on one RF chain, the other RF chains will not be affected. Thus the uplink transmission part (the uplink transmission link) of the RF chain can be activated on when it is required, which can further save the power consumption. In this way, the communication of the UE is not interrupted and the power consumption of the UE is reduced.

If a certain RF chain is allocated to simultaneously receive the data of multiple CCs (Yes in step 504), the activating manner of activating the uplink of the secondary cell corresponding to the multiple CCs is decided based on the particular scenario. In an example in which a certain RF chain is allocated to simultaneously receive the data of multiple CCs, for the intra-frequency CA mode, two CCs are used and the central frequencies of both the CCs are at 800 MHz; the UE has only one RF chain and at this time, the two CCs are allocated to the RD chain. In step 512, the frequency of the uplink being activated is determined. Then in step 514, it is determined whether to use the implicit activating manner or the explicit activating manner based on the frequency of the uplink being activated.

Preferably, a frequency threshold value can be predetermined. When the determined frequency is larger than the threshold value (Yes in step 514), it is determined to employ the implicit activating manner for the uplink in step 516.

Particularly, the activating manner can be determined based on the service type and the data amount borne by the UE. If the service borne by the UE is of the type of burst service or if the data amount is large, which means that the dynamic activating (or deactivating) operation will be frequently performed within a relatively lone time, the communication interrupt resulted from the frequently performed activating operations is intolerable. At this time, the transmission bandwidth of the RF chain is adjusted to be the sum of bandwidths of the entire cells, which means that the implicit activating manner is used to activate the uplink of the secondary cell.

In step 518, it is determined whether the implicit activating manner is currently used. If the implicit activating manner is currently used (Yes in step 518), the message containing the implicit activating manner needs not to be sent.

If the explicit activating manner is currently used (No in step 518), the message containing the implicit activating manner is sent in step 520. For example, an MAC layer control signaling may be sent via network to activate the uplink of the secondary cell.

If the UE finds that the downlink of the secondary cell is activated (step UE564), the uplink of the secondary cell is also activated (UE566). In other words, in response to the activating of the downlink, the corresponding uplink is activated by the UE. In addition, using the implicit activating manner can also avoid the burden of transmitting explicit activating commands necessary for the frequent activation.

If the frequency is less than the threshold value (No in step 514), it is determined to use the explicit activating manner in step 522.

Particularly, if at this time the service borne by the UE is not a burst service or if the data amount is not large, the dynamic activating (or deactivating) operation will not be frequently performed. At this time, to reduce the power consumption of the UE, the transmission bandwidth of the RF chain is adjusted to be the sum of bandwidths of the activated cells, which means that the explicit activating manner is used to activate the uplink of the secondary cell in such situation.

Preferably, the frequency of activating may be determined based on the service type and/or data amount borne by the UE. Preferably, the UE may collect the related information (regarding the amount of data to be uplink transmitted and the service type, etc.) and transmit the data to the base station. The base station decides which activating manner is to be used. Or the decision may be performed by the UE based on the collected information and the result of the decision may be notified to the base station.

In step 524, the message containing the explicit activating manner is sent. Next in step 526, an explicit activating command (e.g. control information transmitted via MAC layer) is transmitted according to the service requirement, to activate the uplink of the cell (UE568).

In step 528, the time period needed to adjust the uplink is estimated. Particularly, the start time and the length of the time period needed to adjust the uplink are estimated. In step 530, no wireless resource block is allocated to the UE during this time period.

Particularly, the re-adjustment of transmission bandwidth due to the activating operation may inevitably result in the interrupt of communication or the loss of data. To reduce the data loss, the following optimizing method may be used: since under the explicit activating manner the activating command is sent from the base station, the base station can predict when the transmission bandwidth of the RF chain of the UE is to be adjusted and can estimate in advance how long will be the time for the adjusting (generally no more than 1 ms). To avoid the data loss during this time period, the base station may adjust the resource allocation algorithm of the scheduler such that no wireless resource block is allocated to the UE during this time period. In this way, the data loss due to the explicit manner can be avoided.

In an embodiment of the solution, the implicit activating manner may be set as the default manner for activating the uplink of the secondary cell. When the base station decides to use the explicit activating manner and transmits the explicit command, it may be determined that the explicit activating manner is employed for activating the uplink of the secondary cell, and the explicit activating manner may be maintained until the secondary cell is deactivated.

In the case of cross-scheduling in CA, in the PDCCH of a certain cell, the data transmission PDSCH of the other cells may be indicated.

Figure 6:
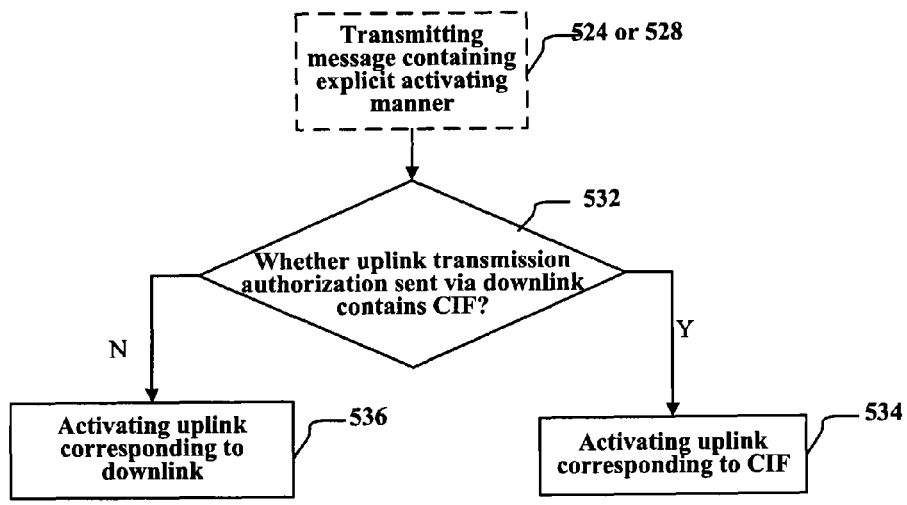
FIG. 6 is a schematic flow chart showing a method of activating by a base station an uplink of a secondary cell of a UE in the case of cross-scheduling.

Referring to FIG. 6, a method of activating by a base station an uplink of a secondary cell of a UE in the case of cross-scheduling is described below.

As shown in FIG. 6, after step 524 or 508, an uplink transmission authorization may be transmitted via the uplink. In step 532, it is determined whether the transmission authorization contains a carrier indicator field. If the transmission authorization contains a carrier indicator field (Yes in step 532), the uplink corresponding to the carrier indicator field is activated in step 534. If the transmission authorization contains no carrier indicator field (No in step 532), the uplink corresponding to the downlink is activated in step 536.

Particularly, if the UE receives, via a cell (which may be a primary cell or a secondary cell), an uplink transmission authorization containing a carrier indicator field (CIF) for another secondary cell (designated by the CIF), the uplink of the designated secondary cell is activated implicitly. If the UE can not receive an uplink transmission authorization via a cell, the uplink of the secondary cell via which an uplink transmission authorization is activated implicitly. In other words, the uplink corresponding to the downlink is activated implicitly. Here the uplink and downlink may be correlated based on system information block 2 (SIB2) (i.e., cell-based correlation), or may be correlated based on UE.

In the case that a UE has multiple of secondary cells, the implicit and explicit activating manners can co-exist in the communication system. For example, the explicit activating manner is currently used to activate the uplinks of all the secondary cells allocated to a UE. An uplink transmission authorization is obtained on any of these secondary cells. At this time the uplink which obtains the uplink transmission authorization is implicitly activated (in the case that there is no CIF). Or the uplink of one of these secondary cells is implicitly activated based on the indication of CIF; while for the other secondary cells, the explicit activating manner is used.

Figure 7:
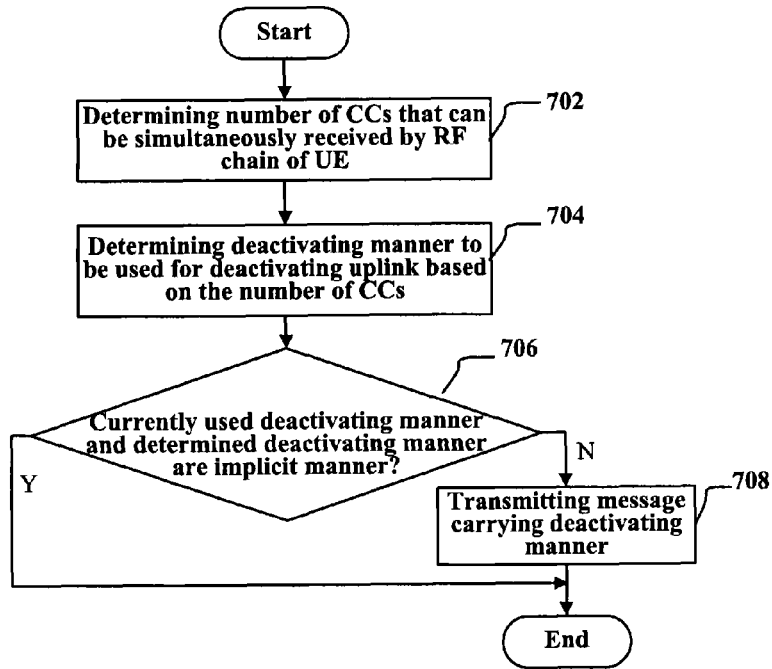
FIG. 7 is a schematic flow chart showing a method of deactivating by a base station an uplink of a secondary cell of a UE according to an embodiment of the invention.

Referring to FIG. 7, a method of deactivating by a base station an uplink of a secondary cell of a UE according to an embodiment of the invention is described below.

As shown in FIG. 7, in step 702 the number of CCs that can be received simultaneously by the RF chain of the UE is determined. In step 704, the deactivating manner to be used for deactivating the uplink is determined based on the number of CCs. In step 706, it is judged whether the currently employed deactivating manner and the deactivating manner determined in step 704 both are implicit deactivating manner. If either of the currently employed deactivating manner and the deactivating manner determined in step 704 is the explicit deactivating manner (No in step 706), a message carrying the determined deactivating manner is sent in step 708. If the currently used deactivating manner and the deactivating manner determined in step 704 both are the implicit deactivating manner (Yes in step 706), the message carrying the determined deactivating manner needs not to be transmitted.

In the embodiment, if the currently used deactivating manner is the implicit deactivating manner and the deactivating manner determined to be used is the explicit deactivating manner, or if the currently used deactivating manner is the explicit deactivating manner and the deactivating manner determined to be used is the explicit deactivating manner, or if the currently used deactivating manner is the explicit deactivating manner and the deactivating manner determined to be used is the implicit deactivating manner, the message carrying the determined deactivating manner is transmitted. If the currently used deactivating manner and the deactivating manner determined to be used both are the implicit deactivating manner, the message carrying the determined deactivating manner is preferably not transmitted. That is, the message carrying the determined deactivating manner is transmitted as required.

The transmitted message may be an MAC layer control signaling from the base station. Or the message may be transmitted by the UE.

Figure 8:
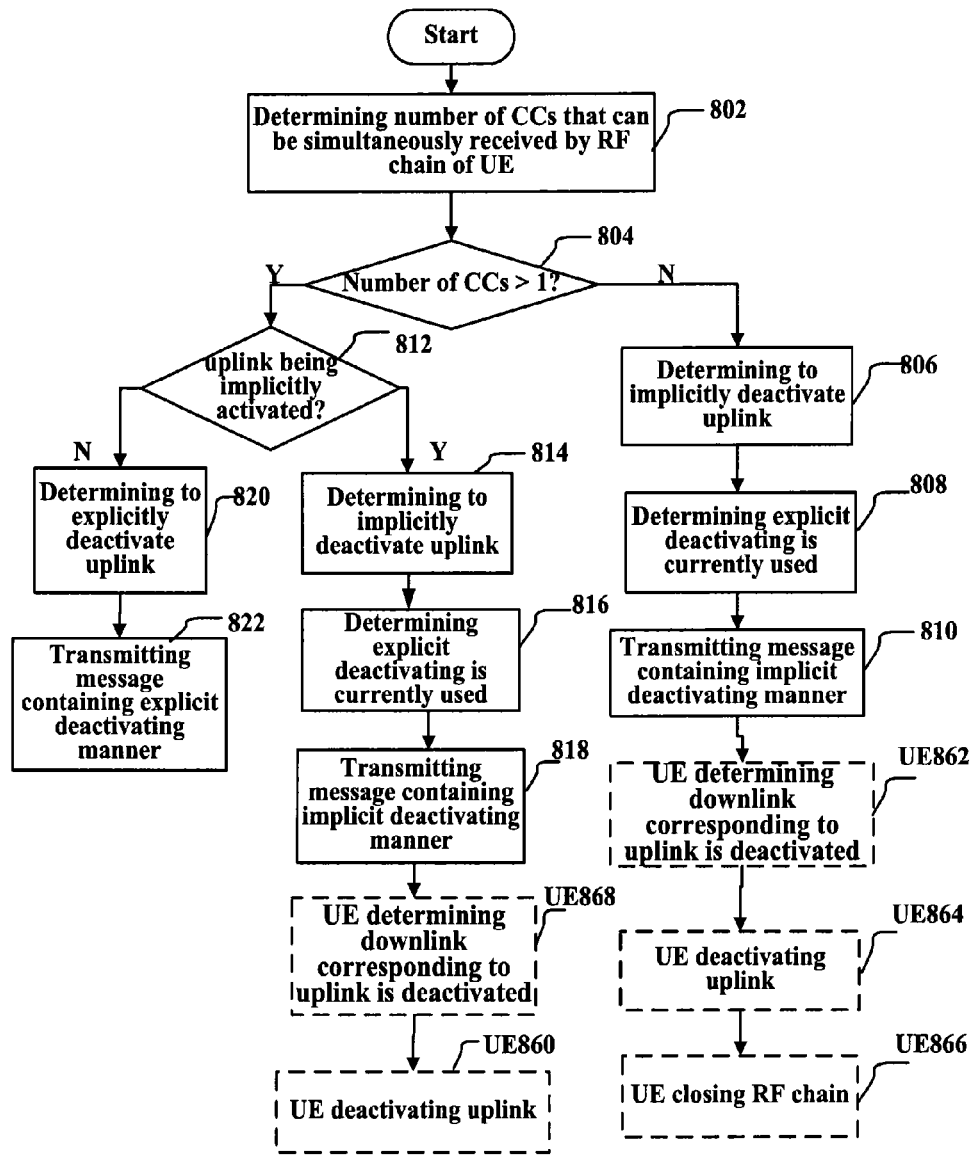
FIG. 8 is a schematic flow chart showing a method of deactivating by a base station an uplink of a secondary cell of a UE according to another embodiment of the invention.

Referring to FIG. 8, a method of deactivating by a base station an uplink of a secondary cell of a UE according to another embodiment of the invention is described below.

As shown in FIG. 8, in step 802 the number of CCs that can be received simultaneously by the RF chain of the UE. In step 804, it is determined whether the number of CCs is larger than 1. If the data of only one CC can be received on a radio frequency chain (No in step 804), in step 806 the implicit deactivating manner is determined to be used. That is, the uplink of the secondary cell corresponding to the frequency is deactivated by using the implicit activating manner after the downlink of the secondary cell is deactivated. In other words, the uplink of the secondary cell is deactivated when the downlink of the secondary cell is deactivated. In an example in which only the data of one CC is received on a certain radio frequency chain, for the inter-frequency CA mode, two CCs are used where the central frequency of one of the CCs is at 800 MHz and the central frequency of the other of the CCs is at 2 GHz; the UE has two RF chains where one RF chain corresponds to the frequency of 800 MHz and the other RF chain corresponds to the frequency of 2 G. In another example in which only the data of one CC is received on a certain radio frequency chain, for the intra-frequency CA mode, two CCs are used where the central frequencies of both CCs are at 800 MHz; the UE has two RF chains and each of the two CCs can be allocated respectively to the corresponding one of the two RF chains.

In step 808 it is determined that the explicit deactivating manner is currently used, and next in step 810 a message carrying the implicit deactivating manner is transmitted. If the currently used deactivating manner is the implicit deactivating manner, the message needs not be transmitted.

After the UE determines that the downlink corresponding to the uplink is deactivated (UE862), the UE deactivates the uplink (UE864).

Deactivating of a secondary cell may be due to the reduction of data transmission amount, or may be due to the deterioration of the signal quality of the cell, or due to the fact that the base station will not schedule the cell within a certain time. In any of the cases, it is unnecessary to keep the uplink of the cell in the activated state. Thus, the deactivated state of the uplink of a secondary cell is bonded to that of the downlink of the secondary cell.

If the secondary cell corresponding to an RF chain is in deactivated state, the RF chain may be closed (UE866), to further reduce the power consumption without affecting the other RF chains.

If an RF chain is allocated to simultaneously receive data of multiple of CCs (Yes in step 804), the deactivating manner for deactivating the uplink of the secondary cell corresponding to the frequency may be determined, after the downlink of the secondary cell is deactivated, based on the activating manner for activating the uplink. In step 812, it is determined whether the activating manner of the uplink is the implicit activating manner.

If the uplink of the secondary cell is activated in the implicit activating manner (Yes in step 812), it is determined in step 814 to use the implicit deactivating manner to deactivate the uplink of the secondary cell. That is, after the downlink of the secondary cell is deactivated, the uplink of the secondary cell is accordingly deactivated. The reason lies in that, if the uplink is activated implicitly, the transmission bandwidth of the UE is the sum of the bandwidth of the entire cells, and thus even if the uplink of a secondary cell is deactivated explicitly, the whole RF chain can not be closed since there is still data transmission on other cells. That is, using the explicit deactivating manner in such a case can not bring about significant reduction in power consumption, but can increase the burden of processing the additional control signaling.

In step 816 is determined that the explicit deactivating manner is currently used, and next in step 818 a message carrying the implicit deactivating manner is transmitted. If the implicit deactivating manner is currently used, the message needs not to be transmitted.

After the UE determines that the downlink corresponding to the uplink is deactivated (UE868), the UE deactivates the uplink (UE860).

If the uplink of the secondary cell is activated explicitly (No in step 812), it is determined in step 820 that the corresponding uplink can be deactivated in explicit deactivating manner. That is, when the uplink needs not to transmit data, for example the uplink can be deactivated by using a designated deactivating signaling transmitted by the MAC layer. In step 822, a message containing the explicit deactivating manner is transmitted. The reason lies in that, if the uplink is activated explicitly, the transmission bandwidth of the UE is the sum of the activated cells, and the downlink of a secondary cell being used for data transmission does not mean that the uplink of this secondary cell is also used for data transmission (the asymmetry of the data amounts of the downlink and uplink), therefore, deactivating the uplink not in use of the secondary cell in time can cause the transmission bandwidth of the RF chain to be adjusted in time, thereby reducing the power consumption of the UE.

The message carrying the activating manner and the message carrying the deactivating manner can be realized by using the MAC layer activating/deactivating control signaling. In the message the explicit activating command or the explicit deactivating command can be multiplexed.

As can be seen from above, the activating/deactivating process of the uplink of a secondary cell may be performed explicitly or implicitly as required by the different scenarios. Thus, the design of the activating/deactivating control signaling may consider the differences of the different scenarios.

The MAC Sub-header of the MAC layer activating/deactivating control signaling may be of the format shown in the following table in which the digit in parentheses represents the number of bits.

| R(1) | R(1) | E(1) | LCID(5) |
|---|---|---|---|

In the above table, the first identification R(1) has 1 bit; the second identification R(1) has 1 bit; and the third identification E indicates whether there is another sub-header following the current sub-header, 1 represents that there is another sub-header following the current sub-header and 0 in parentheses represents that there is not another sub-header following the current sub-header. LCID (logical channel ID) identifies the logical channel instants for activating/deactivating.

MAC payload may use the format as shown in the following table.

| R2(1) | R1(1) | R0(1) | Cell4(1) | Cell3(1) | Cell2(1) | Cell1(l) | Cell0(1) |
|---|---|---|---|---|---|---|---|

When the UE uses the CA transmission mode, each added cell may be allocated a cell index. The table shows an example in which the UE can aggregate at most 5 cells. In this example, 5 bits are sufficient to indicate the activating/deactivating process of the UE under CA mode. The meaning of each bit is explained as follows.

Cell0: activating or deactivating a cell with a cell index of 0. The value 1 indicates activating and 0 indicates deactivating.

Cell1: activating or deactivating a cell with a cell index of 1. The value 1 indicates activating and 0 indicates deactivating.

Cell2: activating or deactivating a cell with a cell index of 2. The value 1 indicates activating and 0 indicates deactivating.

Cell3: activating or deactivating a cell with a cell index of 3. The value 1 indicates activating and 0 indicates deactivating.

Cell4: activating or deactivating a cell with a cell index of 4. The value 1 indicates activating and 0 indicates deactivating.

R0: identifying whether there is another byte following the current byte. The value 1 indicates that there is another byte following and 0 indicates that the transmission content ends here. (This bit is only valid under the explicit activating/deactivating manner of the uplink).

R1: identifying whether the command is valid for uplink or downlink. The value 1 indicates that it is valid for downlink and 0 indicates that it is valid for uplink. (This bit is only valid under the explicit activating/deactivating manner of the uplink).

R2: identifying whether the command is the explicit or implicit activating/deactivating command. The value 1 indicates the implicit command and 0 indicates the explicit command.

In the MAC layer activating/deactivating control signaling, 1 bit is defined to identify whether the command is the explicit or implicit activating/deactivating command. In the MAC layer activating/deactivating control signaling, 1 bit is defined to identify whether the command is valid for uplink or downlink (the bit is only valid under the explicit activating/deactivating manner of the uplink). In the MAC layer activating/deactivating control signaling, 1 bit is defined to identify whether the current byte is followed by another byte (the bit is only valid under the explicit activating/deactivating manner of the uplink).

The above the MAC layer activating/deactivating control signaling is merely an example, rather than a limiting to the signaling. In practice, it may be modified as required. For example, 1 or 0 may has other meanings. And the number of cells that can be aggregated by the UE is not limited to 5, but can be any other value.

Figure 9:
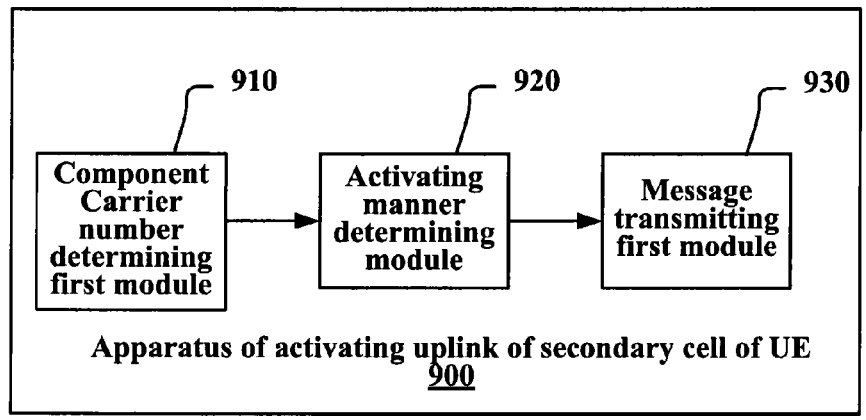
FIG. 9 shows an apparatus of activating an uplink of a secondary cell of a UE according to an embodiment of the invention.

Referring to FIG. 9, an apparatus 900 of activating an uplink of a secondary cell of a UE according to an embodiment of the invention is described below. As shown in FIG. 9, the apparatus 900 of activating an uplink of a secondary cell of a UE includes: a component carrier number determining first module 910 for determining the number of CCs that can be simultaneously received by the RF chain of the UE; an activating manner determining module 920 for determining the activating manner for activating the uplink based on the number of CCs; and a message transmitting first module 930 for transmitting a message carrying the activating manner.

Figure 10:
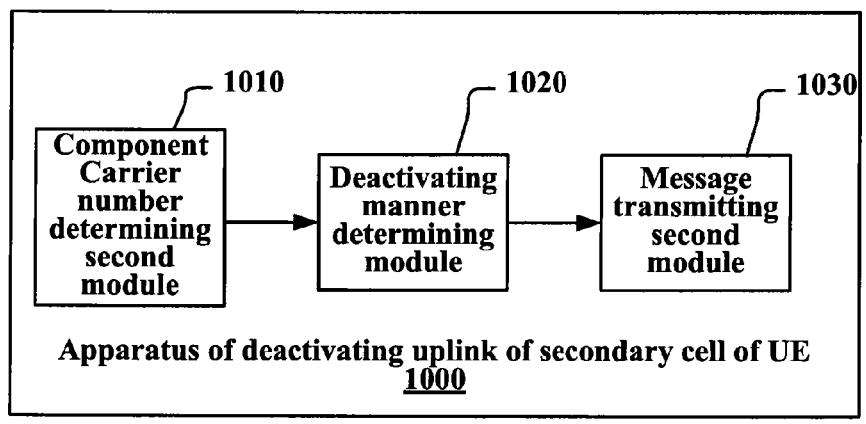
FIG. 10 shows an apparatus of deactivating an uplink of a secondary cell of a UE according to an embodiment of the invention.

Referring to FIG. 10, an apparatus 1000 of deactivating an uplink of a secondary cell of a UE according to an embodiment of the invention is described below. As shown in FIG. 10, the apparatus 1000 of deactivating an uplink of a secondary cell of a UE includes: a component carrier number determining second module 1010 for determining the number of CCs that can be simultaneously received by the RF chain of the UE; a deactivating manner determining module 1020 for determining the deactivating manner for activating the uplink based on the number of CCs; and a message transmitting second module 1030 for transmitting a message carrying the deactivating manner.

Figure 11:
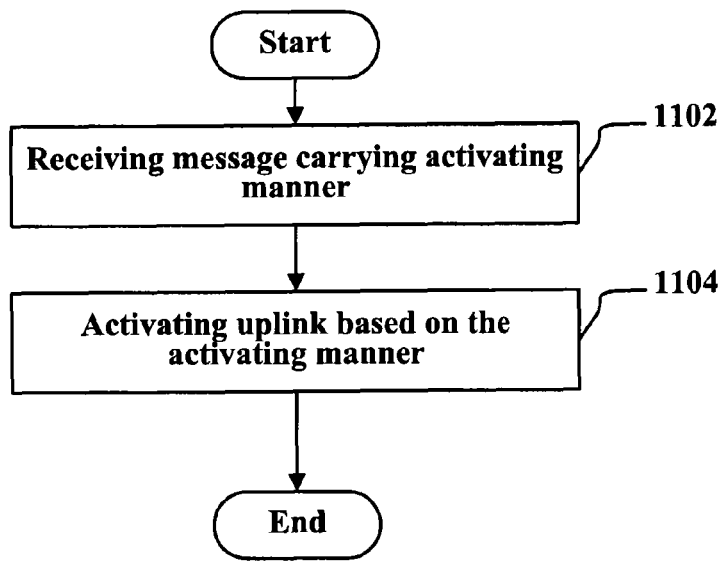
FIG. 11 is a schematic flow chart showing a method of activating by a UE an uplink of a secondary cell of the UE according to an embodiment of the invention.

Referring to FIG. 11, a method of activating by a UE an uplink of a secondary cell of the UE according to an embodiment of the invention is described below.

As shown in FIG. 11, in step 1102 the message carrying the activating manner is received and next in step 1104, the uplink is activated based on the activating manner.

If the activating manner is the explicit activating manner, an explicit activating command is received and in response to the explicit activating command, the uplink is activated. After the uplink is activated, the transmission bandwidth of the RF chain of the UE is adjusted to be the sum of bandwidths of all the activated secondary cells and the primary cell of the UE.

If the activating manner is the implicit activating manner, the transmission bandwidth of the RF chain of the UE is adjusted to be the sum of bandwidths of all the secondary cells and the primary cell of the UE.

Figure 12:
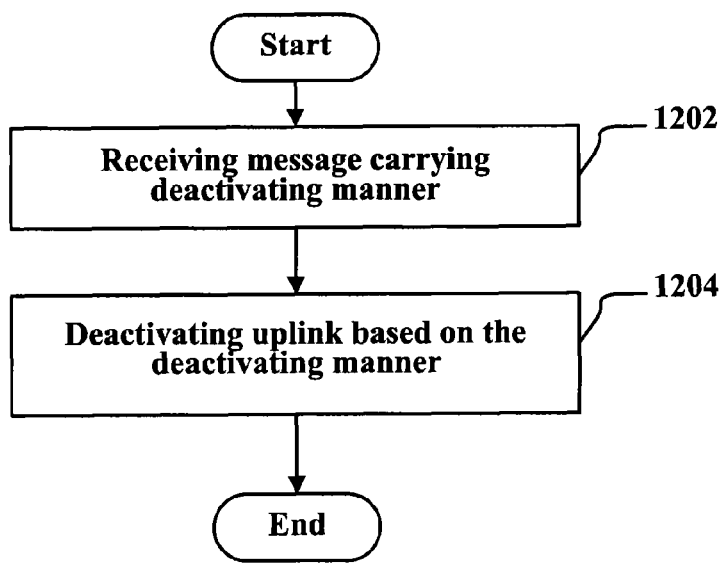
FIG. 12 is a schematic flow chart showing a method of deactivating by a UE an uplink of a secondary cell of the UE according to an embodiment of the invention.

Referring to FIG. 12, a method of deactivating by a UE an uplink of a secondary cell of the UE according to an embodiment of the invention is described below.

As shown in FIG. 12, in step 1202, the message carrying the deactivating manner is received and next in step 1204, the uplink is deactivated based on the deactivating manner. If the deactivating manner is the explicit deactivating manner, an explicit deactivating command is received and in response to the explicit deactivating command, the uplink is deactivated.

Figure 13:
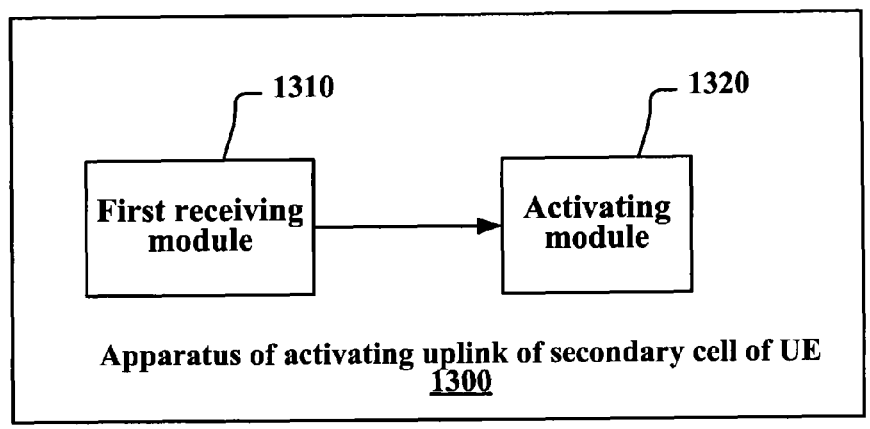
FIG. 13 is a schematic block diagram showing an apparatus of activating an uplink of a secondary cell of a UE according to an embodiment of the invention.

Referring to FIG. 13, an apparatus 1300 of activating an uplink of a secondary cell of the UE according to an embodiment of the invention is described below. As shown in FIG. 13, the apparatus 1300 of activating an uplink of a secondary cell of the UE includes: a first receiving module 1310 for receiving the message carrying the activating manner; and an activating module 1320 for activating the uplink based on the activating manner.

Figure 14:
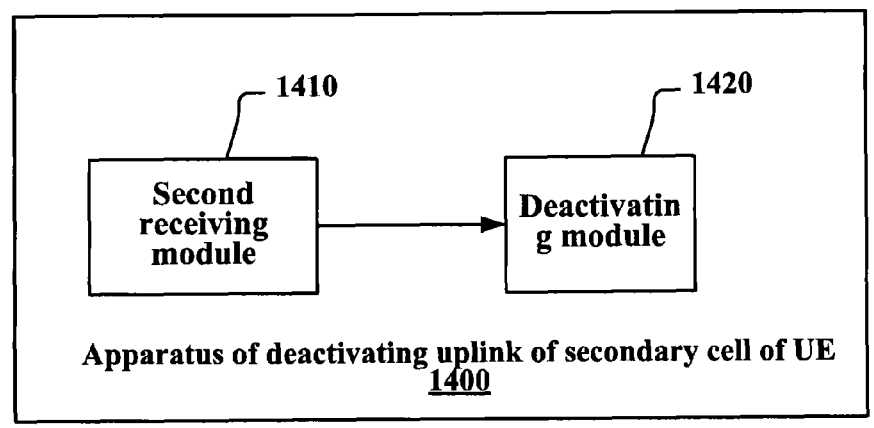
FIG. 14 is a schematic block diagram showing an apparatus of deactivating an uplink of a secondary cell of a UE according to an embodiment of the invention.

Referring to FIG. 14, an apparatus 1400 of deactivating an uplink of a secondary cell of the UE according to an embodiment of the invention is described below. As shown in FIG. 14, the apparatus 1400 of deactivating an uplink of a secondary cell of the UE includes: a second receiving module 1410 for receiving the message carrying the deactivating manner; and a deactivating module 1420 for deactivating the uplink based on the deactivating manner.

According to an embodiment of the invention, if a UE has multiple of RF chains, the open and close of a certain RF chain will not interrupt the communication on the other RF chains. Therefore, when a secondary cell is activated or deactivated, the corresponding RF chain needs only to be opened or closed accordingly, which will not result in the communication interrupt on the other RF chains. In addition, the RF chain may be opened or closed as required to reduce the power consumption of the UE. In some of the above embodiments of the invention, by using an appropriate activating/deactivating manner according to the number of RF chains owned by the UE and the possible frequency of activating/deactivating operation of the UE, the power consumption of the UE can be further reduced and the communication interrupt due to the frequently switching of the activating/deactivating can be avoided. In addition, when communication interrupt is inevitable due to the change in activating/deactivating states, the scheduler can estimate in advance the time when the communication interrupt occurs and the length of time period of the communication interrupt, so as to avoid scheduling the cell within this time period, thereby reducing the data loss due to the communication interrupt. In addition, by flexibly configuring an activating manner of the uplink according to the number of RF chains owned by the UE and the service type and traffic of the UE, the compromise between the power consumption of the UE and the communication interrupt due to the frequently switching of the activating/deactivating states can be achieved.

Those skilled in the art can understand that the above embodiments and examples are illustrative. The present disclosure should not be regarded as being limited to any particular embodiments or examples stated above.

In the disclosure, the expressions, such as "the first", "the second", and "the Nth" are used. Those skilled in the art will appreciate that such expressions are used merely to differentiate the terms in literal so as to describe the invention clearly, and should not be considered as defining the sequence or the like of the terms.

As an example, the component modules, units or steps in the above apparatuses and methods can be configured with software, hardware, firmware or any combination thereof in the base station (e.g. eNodeB) or terminal node (e.g. the UE) of the communication system, as part of the physical layer apparatus of the base station or the terminal node. The components, units or steps in the above apparatuses and methods can be configured with software, hardware, firmware or any combination thereof by using any appropriate means or manners known in the art, the description of which is not detailed herein. As an example, the above feedback information receiving apparatuses and methods may be realized in the physical layer apparatus of the base station by modifying the related parts of the base station.

As can be understood, a system including the above apparatus according to any of the above embodiments should also be encompassed in the protection scope of the invention.

Figure 15:
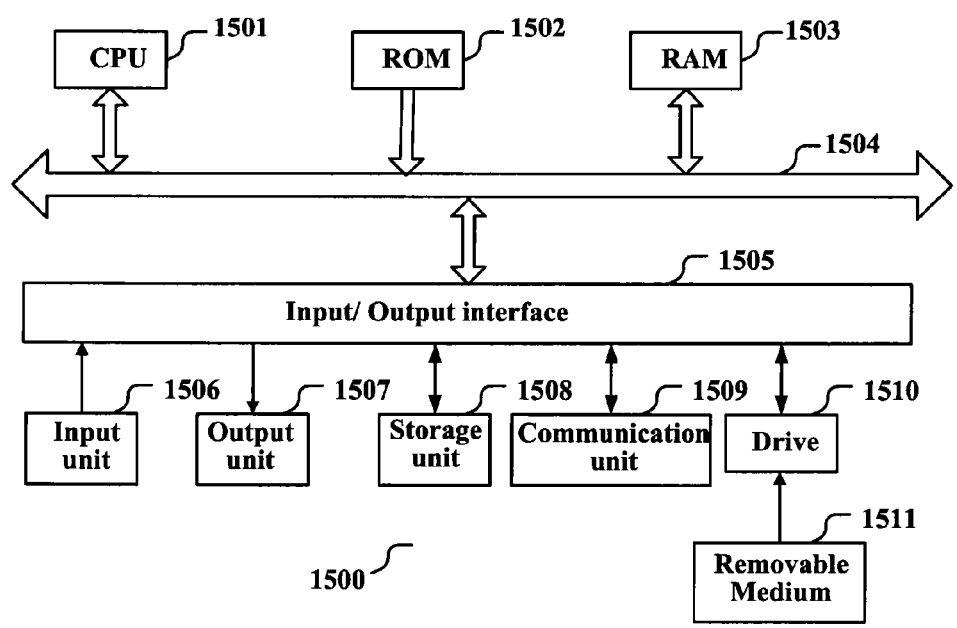
FIG. 15 is a schematic block diagram showing the structure of a computer realizing embodiments of the disclosure.

As an example, in the case of using software or firmware, programs constituting the software for realizing the above method or apparatus can be installed to a computer with a specialized hardware structure (e.g. the general purposed computer 1500 as shown in FIG. 15) from a storage medium or a network. The computer, when installed with various programs, is capable of carrying out various functions.

In FIG. 15, a central processing unit (CPU) 1501 executes various types of processing in accordance with programs stored in a read-only memory (ROM) 1502, or programs loaded from a storage unit 1508 into a random access memory (RAM) 1503. The RAM 1503 also stores the data required for the CPU 1501 to execute various types of processing, as required. The CPU 1501, the ROM 1502, and the RAM 1503 are connected to one another through a bus 1504. The bus 1504 is also connected to an input/output interface 1505.

The input/output interface 1505 is connected to an input unit 1506 composed of a keyboard, a mouse, etc., an output unit 1507 composed of a cathode ray tube or a liquid crystal display, a speaker, etc., the storage unit 1508, which includes a hard disk, and a communication unit 1509 composed of a modem, a terminal adapter, etc. The communication unit 1509 performs communicating processing. A drive 1510 is connected to the input/output interface 1505, if needed. In the drive 1510, for example, removable media 1511 is loaded as a recording medium containing a program of the present invention. The program is read from the removable media 1511 and is installed into the storage unit 1508, as required.

In the case of using software to realize the above consecutive processing, the programs constituting the software may be installed from a network such as Internet or a storage medium such as the removable media 1511.

Those skilled in the art should understand the storage medium is not limited to the removable media 1511, such as, a magnetic disk (including flexible disc), an optical disc (including compact-disc ROM (CD-ROM) and digital versatile disk (DVD)), a magneto-optical disc (including an MD (Mini-Disc) (registered trademark)), or a semiconductor memory, in which the program is recorded and which are distributed to deliver the program to the user aside from a main body of a device, or the ROM 1502 or the hard disc involved in the storage unit 1508, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

The invention claimed is:

1. A communication link activating method, for activating an uplink of a secondary cell for a user equipment, comprising:
    determining, by circuitry of a communication link activating apparatus, the number of component carriers received simultaneously by a radio frequency chain for the user equipment;
    determining, by the circuitry, an activating manner employed for activating the uplink according to the number of the component carriers; and
    sending a message carrying the activating manner.

2. The method according to claim 1, wherein determining an activating manner employed for activating the uplink according to the number of the component carriers comprises:

when the number of the component carriers is 1, determining that an explicit activating manner is employed for activating the uplink.

3. The method according to claim 1, wherein determining an activating manner employed for activating the uplink according to the number of the component carriers comprises:
when the number of the component carriers is larger than 1, determining a frequency for activating the uplink; and
determining an activating manner employed for activating the uplink according to the frequency.

4. The method according to claim 3, wherein determining a frequency for activating the uplink comprises:
determining a service type and/or an amount of data born by the user equipment; and
determining the frequency for activating the uplink according to the service type and/or the amount of data.

5. The method according to claim 4, wherein determining an activating manner employed for activating the uplink according to the frequency comprises:
when the frequency is high, determining that an implicit activating manner is employed for activating the uplink; and
when the frequency is low, determining that an explicit activating manner is employed for activating the uplink.

6. The method according claim 5, when an explicit activating manner is employed for activating the uplink, the method further comprising:
estimating a period of time required for adjusting the uplink; and
assigning no wireless resource block to the user equipment in the period of time.

7. The method according to claim 2, further comprising:
sending an uplink transmission authorization with a carrier instruction field through a downlink; and
activating the uplink corresponding to the carrier instruction field.

8. The method according to claim 2, further comprising:
sending an uplink transmission authorization without a carrier instruction field through a downlink; and
activating the uplink associated with the downlink.

9. A communication link deactivating method, for deactivating an uplink of a secondary cell for a user equipment, comprising:
determining, by circuitry of a communication link deactivating apparatus, the number of component carriers received simultaneously by a radio frequency chain for the user equipment;
determining, by the circuitry, a deactivating manner employed for deactivating the uplink according to the number of the component carriers; and
sending a message carrying the deactivating manner.

10. The method according to claim 9, wherein determining a deactivating manner employed for deactivating the uplink according to the number of the component carriers comprises:
when the number of the component carriers is 1, determining that an implicit manner is employed for deactivating the uplink.

11. The method according to claim 10, further comprising:
closing the radio frequency chain after the uplink is deactivated.

12. The method according to claim 9, wherein determining a deactivating manner employed for deactivating the uplink according to the number of the component carriers comprises:
when the number of the component carriers is larger than 1, determining an activating manner employed for activating the uplink; and
determining the deactivating manner employed for deactivating the uplink according the activating manner.

13. The method according to claim 12, wherein determining the deactivating manner employed for deactivating the uplink according the activating manner comprises:
when the activating manner is an explicit activating manner, determining that an explicit deactivating manner is employed for deactivating the uplink.

14. The method according to claim 12, wherein determining the deactivating manner employed for deactivating the uplink according the activating manner comprises:
when the activating manner is an implicit activating manner, determining that an implicit deactivating manner is employed for deactivating the uplink.

15. A communication link activating apparatus, for activating an uplink of a secondary cell for a user equipment, comprising:
circuitry configured to
determine the number of component carriers received simultaneously by a radio frequency chain for the user equipment;
determine an activating manner employed for activating the uplink according to the number of the component carriers; and
send a message carrying the activating manner as desired.

16. A communication link deactivating apparatus, for deactivating an uplink of a secondary cell for a user equipment, comprising:
circuitry configured to
determine the number of component carriers received simultaneously by a radio frequency chain for the user equipment;
determine an deactivating manner employed for deactivating the uplink according to the number of the component carriers; and
send a message carrying the deactivating manner as desired.

17. A communication link activating method, for activating an uplink of a secondary cell for a user equipment, comprising:
receiving, by circuitry of a communication link activating apparatus, a message carrying an activating manner determined according to a number of component carriers received simultaneously by a radio frequency chain of the user equipment; and
activating, by the circuitry, the uplink according to the activating manner.

18. The method according to claim 17, wherein activating the uplink according to the activating manner comprises:
when the activating manner is an explicit activating manner, receiving an explicit activating command; and
activating the uplink in response to the explicit activating command.

19. The method according to claim 18, wherein after the uplink is activated, the method further comprises:
adjusting a transmission bandwidth of the radio frequency chain for the user equipment to a sum of bandwidths of a primary cell and all activated secondary cells for the user equipment.

20. The method according to claim 17, wherein activating the uplink according to the activating manner comprises:
when the activating manner is an implicit activating manner, adjusting a transmission bandwidth of the radio frequency chain for the user equipment to a sum of bandwidths of a primary cell and all secondary cells configured for the user equipment.

21. A communication link deactivating method, for deactivating an uplink of a secondary cell for a user equipment, comprising:
   receiving, by circuitry of a communication link deactivating apparatus, a message carrying an deactivating manner determined according to a number of component carriers received simultaneously by a radio frequency chain of the user equipment; and
   deactivating, by the circuitry, the uplink according to the deactivating manner.

22. The method according to claim 21, wherein deactivating the uplink according to the deactivating manner comprises:
   when the deactivating manner is an explicit deactivating manner, receiving an explicit deactivating command; and
   deactivating the uplink in response to the explicit deactivating command.

23. The method according to claim 21, wherein deactivating the uplink according to the deactivating manner comprises:
   when the deactivating manner is an implicit deactivating manner, determining whether a downlink corresponding to the uplink is deactivated; and
   when the downlink is deactivated, deactivating the uplink.

24. A communication link activating apparatus, for activating an uplink of a secondary cell for a user equipment, comprising:
   circuitry configured to
      receive a message carrying an activating manner determined according to a number of component carriers received simultaneously by a radio frequency chain of the user equipment; and
      activate the uplink according to the activating manner.

25. A communication link deactivating apparatus, for deactivating an uplink of a secondary cell for a user equipment, comprising:
   circuitry configured to
      receive a message carrying an deactivating manner determined according to a number of component carriers received simultaneously by a radio frequency chain of the user equipment; and
      deactivate the uplink according to the deactivating manner.

* * * * *